No. 843,897. PATENTED FEB. 12, 1907.
C. C. KORNS.
ADJUSTABLE GUARD RAIL FASTENER.
APPLICATION FILED APR. 11, 1906.
2 SHEETS—SHEET 1.
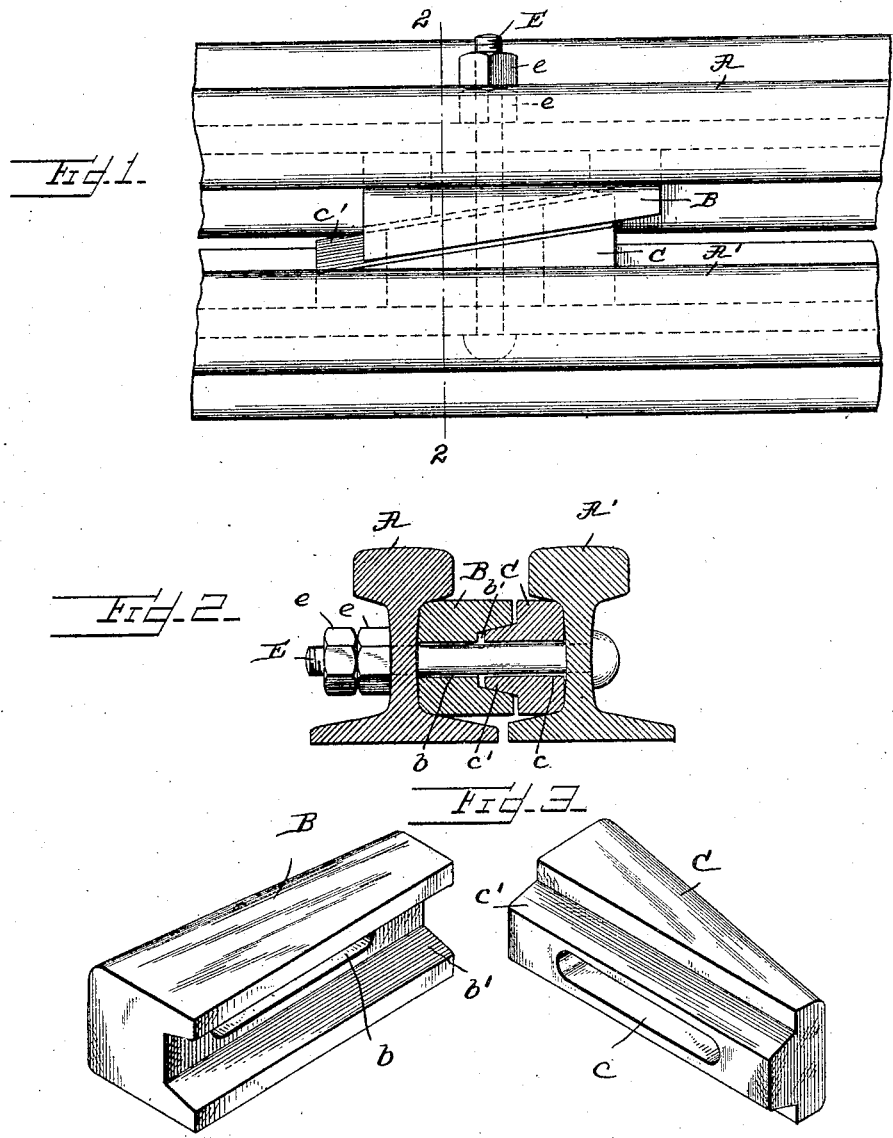

No. 843,897. PATENTED FEB. 12, 1907.
C. C. KORNS.
ADJUSTABLE GUARD RAIL FASTENER.
APPLICATION FILED APR. 11, 1906.
2 SHEETS—SHEET 2.
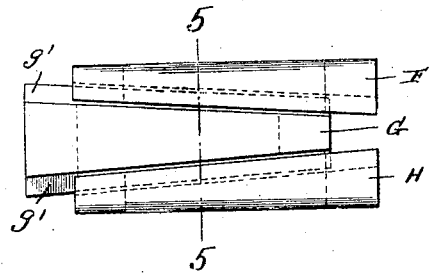
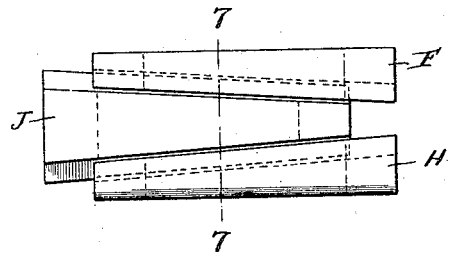
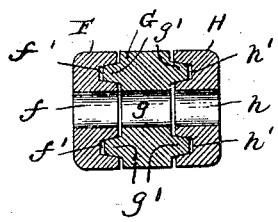
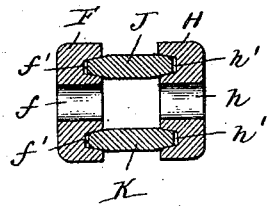
WITNESSES:
INVENTOR
C.C. Korns.
BY
Jesse B. Heller
ATTORNEY.

UNITED STATES PATENT OFFICE.

CLARENCE C. KORNS, OF JOHNSTOWN, PENNSYLVANIA, ASSIGNOR TO THE LORAIN STEEL COMPANY, A CORPORATION OF PENNSYLVANIA.

ADJUSTABLE GUARD-RAIL FASTENER.

No. 843,897.　　Specification of Letters Patent.　　Patented Feb. 12, 1907.

Application filed April 11, 1906. Serial No. 311,045.

*To all whom it may concern:*

Be it known that I, CLARENCE C. KORNS, of Johnstown, in the county of Cambria and State of Pennsylvania, have invented a new and useful Improvement in Adjustable Guard-Rail Fasteners, of which the following is a full, clear, and exact description, reference being had to the accompanying drawings, which form a part of this specification.

This invention relates to certain new and useful improvements in guard-rail fasteners; and it has for its object to provide a simple, cheap, and efficient device of this character which will firmly hold the guard-rail in its proper relation with the main rail and which can be adjusted without withdrawing the guard-rail in order to adjust the chock members.

With these objects in view my invention consists of the novel construction, arrangement, and combination of parts, all substantially as hereinafter described, and pointed out in the appended claims, reference being had to the accompanying drawings, in which—

Figure 1 is a plan view of a main rail and a guard-rail with my improved chock attached thereto. Fig. 2 is a sectional view on the line 2 2 of Fig. 1. Fig. 3 is a perspective view of the chock members shown in Figs. 1 and 2. Fig. 4 is a plan view of a modified form of chock. Fig. 5 is a sectional view on the line 5 5 of Fig. 4. Fig. 6 is a plan view of another modified form of chock, and Fig. 7 is a sectional view on the line 7 7 of Fig. 6.

A is the main rail, A' the guard-rail, and B and C are the chock members. The rails A A' and the chock members B and C are rigidly held together by means of the bolt E and nuts $e$ $e$, the bolt E passing through orifices in the rails A A' and elongated orifices $b$ and $c$ in the respective chock members B and C. The chock members B and C are tapered or wedge-shaped. The member B is provided with the groove $b$, which is slightly tapered in cross-section, while the member C is provided with a tongue $c'$, whose cross-section is of the same taper as the cross-section of the groove $b'$, but slightly greater in width than the width of the groove.

In Figs. 4 and 5 the chock is composed of the three tapered members F, G, and H, provided with the elongated slots $f$, $g$, and $h$, respectively, the members F and H being provided with tapered grooves $f'$ $f'$ and $h'$ $h'$, respectively, while the member G is provided with the tapered tongues $g'$ $g'$ on each side thereof, the tongues $g'$ $g'$ on one side of the member G entering the grooves $f'$ $f'$ of the member F, and the tongues $g'$ $g'$ on the other side of the member G entering the grooves $h'$ $h'$ of the member H.

In Figs. 6 and 7 the chock is composed of the four tapered members F, H, J, and K. The tops and bottoms of the members J and K are chamfered and are inserted into the respective grooves $f'$ and $h'$ of the members F and G.

It will readily be understood by reference to the drawings that when the rails and chock members are bolted together the chock members will be locked from vertical movement by means of the tongue and groove and will be held from horizontal movement by the frictional engagement of the tapered portion of the tongue and groove.

Having thus described my invention, what I claim as new, and desire to secure by Letters Patent, is—

1. An adjustable chock, tapered chock members provided with an interlocking tapered tongue and groove.

2. An adjustable chock, tapered chock members provided with an interlocking wedge-shaped tongue and groove.

3. An adjustable rail-chock having a plurality of wedge members, provided with wedge-shaped frictionally-interlocking tongue-and-groove connections.

In testimony whereof I have affixed my signature in presence of two witnesses.

CLARENCE C. KORNS.

Witnesses:
　JESSE B. HELLER,
　H. W. SMITH.